United States Patent
Pearl, Jr. et al.

(10) Patent No.: US 11,499,084 B2
(45) Date of Patent: *Nov. 15, 2022

(54) EXPANSION AGENTS FOR CEMENT COMPOSITIONS

(71) Applicant: HALLIBURTON ENERGY SERVICES, INC., Houston, TX (US)

(72) Inventors: William Cecil Pearl, Jr., Spring, TX (US); Samuel Jason Lewis, Spring, TX (US); Thomas Jason Pisklak, Cypress, TX (US); Stephanie Ruiz, Spring, TX (US); Paul Joseph Jones, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 377 days.

This patent is subject to a terminal disclaimer.

(21) Appl. No.: 16/609,252

(22) PCT Filed: Dec. 3, 2018

(86) PCT No.: PCT/US2018/063621
§ 371 (c)(1),
(2) Date: Oct. 29, 2019

(87) PCT Pub. No.: WO2020/117192
PCT Pub. Date: Jun. 11, 2020

(65) Prior Publication Data
US 2021/0403791 A1  Dec. 30, 2021

(51) Int. Cl.
*C09K 8/46* (2006.01)
*C04B 28/24* (2006.01)
(Continued)

(52) U.S. Cl.
CPC .............. *C09K 8/46* (2013.01); *C04B 28/24* (2013.01); *E21B 33/14* (2013.01); *C04B 2111/00146* (2013.01); *C04B 2111/34* (2013.01)

(58) Field of Classification Search
CPC ............................ E21B 33/00; C04B 14/04
See application file for complete search history.

(56) References Cited

U.S. PATENT DOCUMENTS 4,002,483 A   1/1977  Daugherty et al.
5,158,613 A * 10/1992  Sargeant .................. C09K 8/46
                                                106/737
(Continued)

FOREIGN PATENT DOCUMENTS

EP      1686109 B1    1/2015
WO      2014053699 A1  4/2014
(Continued)

OTHER PUBLICATIONS

International Search Report and Written Opinion; PCT Application No. PCT/US2018/063621; dated Aug. 28, 2019.
(Continued)

*Primary Examiner* — Angela M DiTrani Leff
*Assistant Examiner* — Avi T Skaist
(74) *Attorney, Agent, or Firm* — Novak Druce Carroll LLP

(57) ABSTRACT

Expansive cement compositions for use in subterranean wellbores that include a monophase amorphous hydraulic binder material (MAHBM). The MAHBM may include a plurality of particles having a silica core and an amorphous coating substantially surrounding the silica core. The coating may comprise, for example, a plurality of amorphous α-dicalcium silicate hydrate nanoparticles or microparticles. The MAHBM may be used as an expansion agent in a cement composition or used as an expansive cement by itself.

10 Claims, 5 Drawing Sheets

(51) Int. Cl.
*E21B 33/14* (2006.01)
*C04B 111/00* (2006.01)
*C04B 111/34* (2006.01)

(56) References Cited

U.S. PATENT DOCUMENTS

| | | |
|---|---|---|
| 8,226,763 B2 | 7/2012 | Beuchle et al. |
| 8,226,764 B2 | 7/2012 | Beuchle et al. |
| 8,382,892 B2 | 2/2013 | Beuchle et al. |
| 2010/0186634 A1* | 7/2010 | Beuchle .................. C04B 28/18 |
| | | 106/638 |
| 2011/0041737 A1 | 2/2011 | Beuchle et al. |
| 2015/0107493 A1 | 4/2015 | Rice |
| 2017/0145288 A1 | 5/2017 | Agapiou et al. |
| 2017/0349485 A1* | 12/2017 | Horta ........................ C04B 7/26 |

FOREIGN PATENT DOCUMENTS

| | | | | |
|---|---|---|---|---|
| WO | WO2014/053699 | * | 4/2014 | ............. C04B 22/08 |
| WO | 2017174208 A1 | | 10/2017 | |

OTHER PUBLICATIONS

English Abstract of EP1686109 from www.espacenet.com dated Oct. 29, 2019.

* cited by examiner

EXPANSION AGENTS FOR CEMENT COMPOSITIONS

CROSS-REFERENCE TO RELATED APPLICATIONS

This application is a national stage entry of PCT/US2018/063621 filed Dec. 3, 2018, said application is expressly incorporated herein in its entirety.

FIELD

The present disclosure relates to expansion agents for cement compositions in a wellbore environment.

BACKGROUND

In order to access downhole hydrocarbon sources, a wellbore is typically drilled deep within the earth through various underground rock formations. After drilling is terminated, and prior to stimulation and production processes, a steel casing is often provided along a length of the wellbore. The steel casing assists in maintaining the integrity of the wellbore as well as controlling the flow of fluids, for instance preventing wellbore fluids from leaking into freshwater underground reservoirs.

The casing is often made up of a large number of individual tubulars referred to as joints, together forming a casing string. The casing is cemented in place, for instance by pumping a cement composition into the annulus between the casing and a surface of the wellbore. The cement is then allowed to set and form a sheath around the casing. Accordingly, the cement adds an additional barrier as well as provides support to the casing and maintains it in place.

Upon hydration, conventional cement slurries experience shrinkage if no expansion agent is contained within the cement composition. Conventional expansion agents include alkali metal oxide based components, such as magnesium oxide based components, and those based on ettringite formation. However, both of these conventional expansion agents require access to water to achieve expansion as they draw water from the surrounding area to increase the volume of the set cement. Additional expansion agents as well as expansive cements are desirable.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
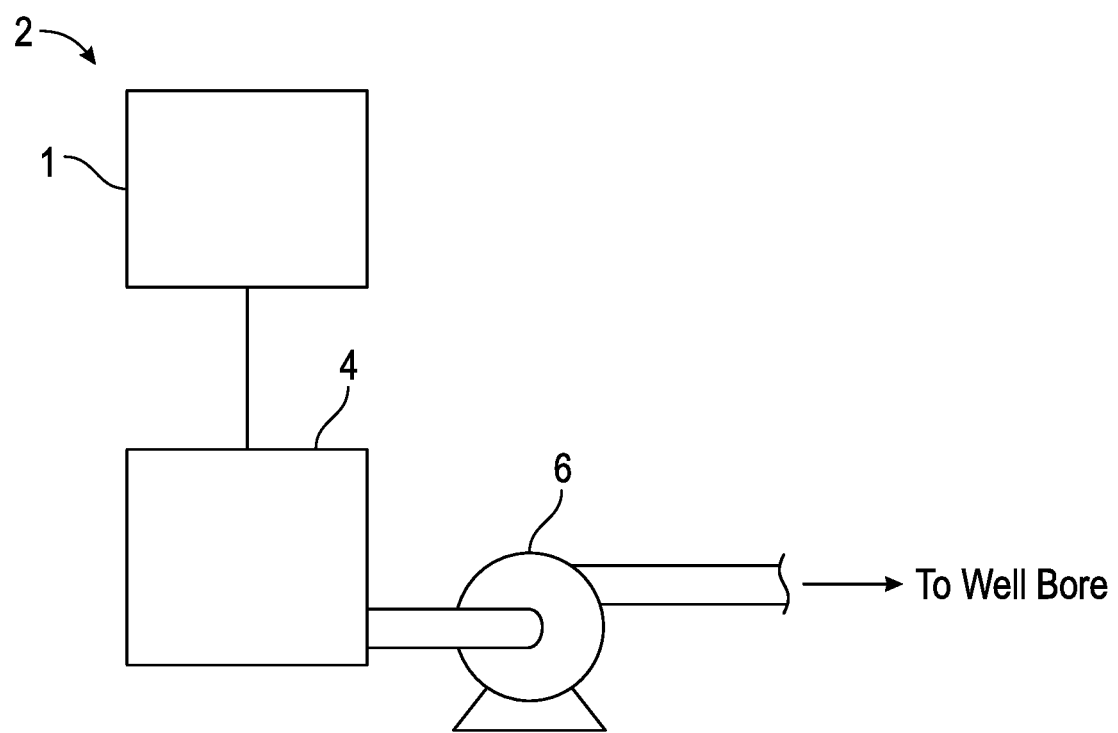
FIG. 1 illustrates a system for preparation and delivery of a cement composition to a well bore, in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein are expansive cement compositions and expansion agents that may be included as additives in cement compositions. Among other applications, the presently disclosed expansive cement compositions and cement expansion agents are suitable for use in a wellbore environment. Specifically, the present disclosure is directed to the use of monophase amorphous hydraulic binder materials (MAHBMs) as an expansive cement or as an expansion agent additive to cements to counteract the detrimental effects associated with shrinkage of cement during curing. The presently disclosed, cement compositions comprising MAHBMs are effective in helping to ensure wellbore integrity and for minimizing risk of isolation failures or the need for remedial wellbore work due to shrinkage related issues. The expansive MAHBMs provide an additional method to effect expansive properties in cement formulations. Additionally, use of the presently disclosed expansion agents and expansive cements results in expansion throughout the entire cement sheath as opposed to only at the interfaces that contact water or those to which water has diffused.

According to at least one aspect of the present disclosure, an expansive cement composition for use in a subterranean wellbore is provided. The expansive cement composition may include a monophase amorphous hydraulic binder material (MAHBM) and water. In at least some instances, the MAHBM is added to the cement composition as an expansion agent additive. The MAHBM may comprise a plurality of particles having a silica core and an amorphous coating substantially surrounding the silica core. In at least some instances, the coating is an amorphous α-dicalcium silicate hydrate coating and the silica cores is a crystalline silica core. In at least some instances, the coating comprises a plurality of α-dicalcium silicate hydrate nanoparticles or microparticles. The cement composition may include, for example, from about 1% to about 70% MAHBM by weight, or from about 5% to about 40% MAHBM by weight, or from about 10% to about 20% MAHBM by weight, or from about 10% to about 30% MAHBM by weight, or from about 10% to about 40% MAHBM by weight.

According to at least one other aspect of the present disclosure, an expansive cement composition for use in a subterranean wellbore is provided that includes primarily MAHBM. In such cases, MAHBM may be the majority component of the cement composition. For example, the cement composition may include at least 50% MAHBM by weight of the cement composition. In other instances, the cement composition may include at least 40% MAHBM by weight. In at least some instances, such cement compositions do not include Portland cement.

According to at least one aspect of the present disclosure, a method of preparing a reduced shrinkage cement composition for use in a subterranean wellbore is provided. The method may include providing a cement composition and adding an expansive agent to the cement composition to form a reduced shrinkage cement composition. The expansive agent may comprise a monophase amorphous hydraulic binder material (MAHBM). In at least some instances, the MAHBM is the only expansive agent added to the cement composition.

According to at least one aspect of the present disclosure, a method of conducting a cementing operation in a subterranean wellbore using an expansive cement is provided. The method may include providing a cement composition comprising a monophase amorphous hydraulic binder material (MAHBM). The method may also include introducing the cement composition into a wellbore and allowing the cement composition to cure to form a cured cement composition. In at least some instances, the cured cement composition has an expanded volume as compared to the introduced cement composition. In some cases, the cured cement composition is expanded in at least one direction of length as compared to the introduced cement composition.

Figure 2:
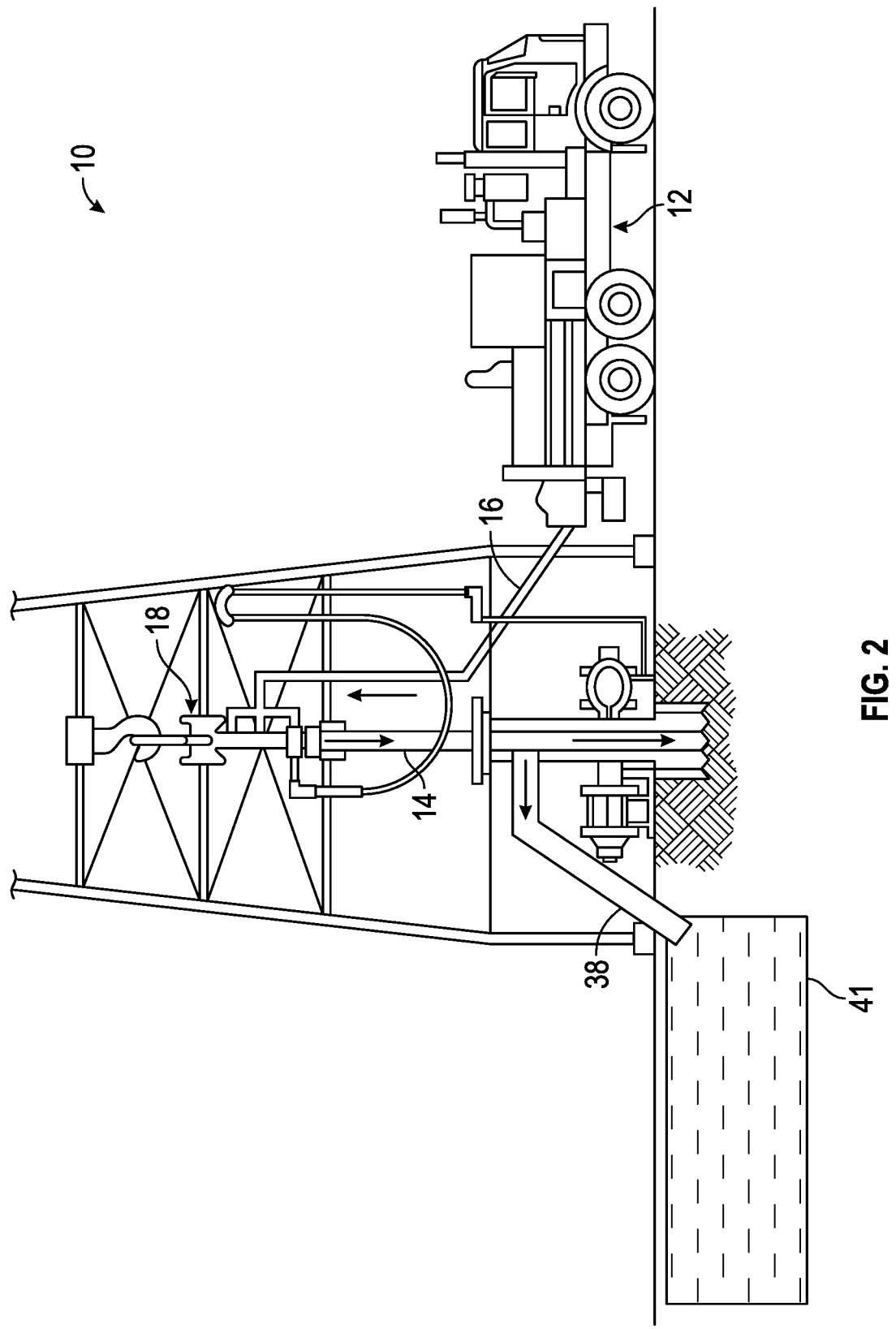
FIG. 2 illustrates surface equipment that may be used in placement of a cement composition in a well bore, in accordance with aspects of the present disclosure.
Figure 3:
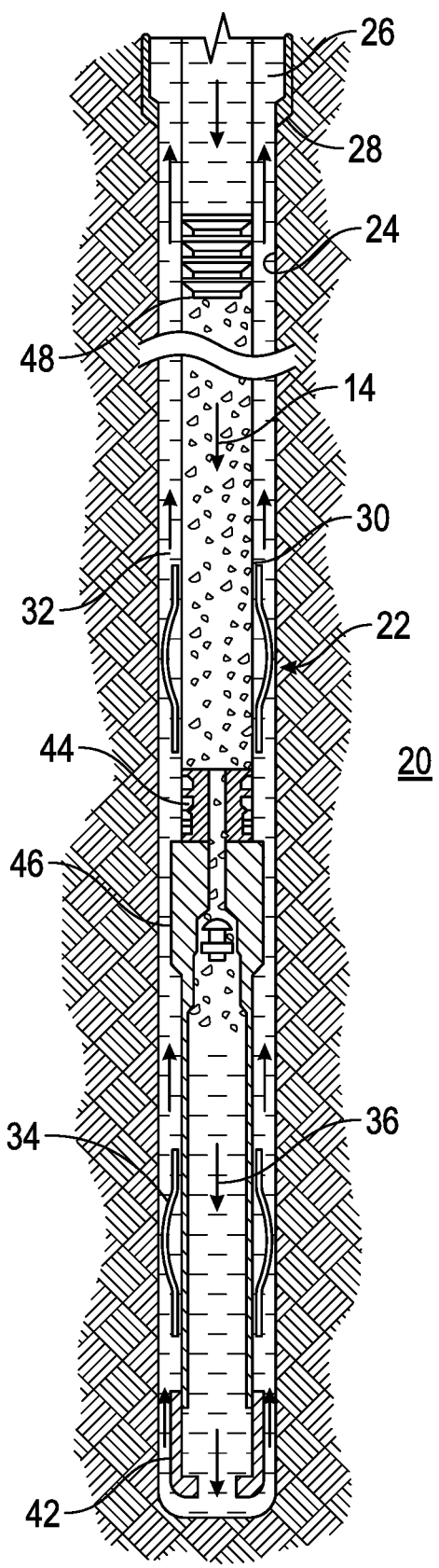
FIG. 3 illustrates placement of a cement composition into a well bore annulus, in accordance with aspects of the present disclosure.

FIGS. 1-3 describe the mixing and pumping of a cement composition, such as a cement slurry, including the presently disclosed cement compositions having MAHBMs. FIG. 1 is a diagram of a system that may be used in the preparation of a cement composition in accordance with example embodiments that will now be described. FIG. 1 illustrates a system 2 for preparation of a cement composition and delivery to a well bore in accordance with certain embodiments. The suspension agent 1, which may be held in a container, may be pumped or added in liquid form to the cement and water being mixed in mixing equipment 4 thereby forming a cement composition. As shown, the cement composition (in the form of a cement slurry) may be contained and mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

An example technique and system for placing a cement composition into a subterranean formation will now be described with reference to FIGS. 2 and 3. FIG. 2 is a diagram illustrating surface equipment 10 that may be used in the placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

FIG. 3 is a diagram illustrating the cement composition 14 being introduced into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line, such as flow line 38 depicted in FIG. 2, and be deposited, for example, in one or more retention pits 41 (e.g., a mud pit), as shown on FIG. 2. Referring again to FIG. 3, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 3, the bottom plug 44 is shown on the landing collar 46. In the illustrated embodiment, a top plug 48 may be introduced into the well bore 22 behind the cement composition 14. The top plug 48 may separate the cement composition 14 from a displacement fluid and also push the cement composition 14 through the bottom plug 44.

Typically, conventional cements shrink in volume during the hydration and curing phase, and this shrinkage can lead to many problems in well operation. Most notable of these problems is the loss of zonal isolation due to void space or channels formed during shrinkage. In order to combat this, expansion agents are mixed as additives with the cement. Expansion agents induce either a net expansion of the cement or a zero net change in volume of the cement.

Typically, these expansion agents are compounds such as calcium aluminate, calcium sulfate hemihydrate, or magnesium oxide.

Figure 4:
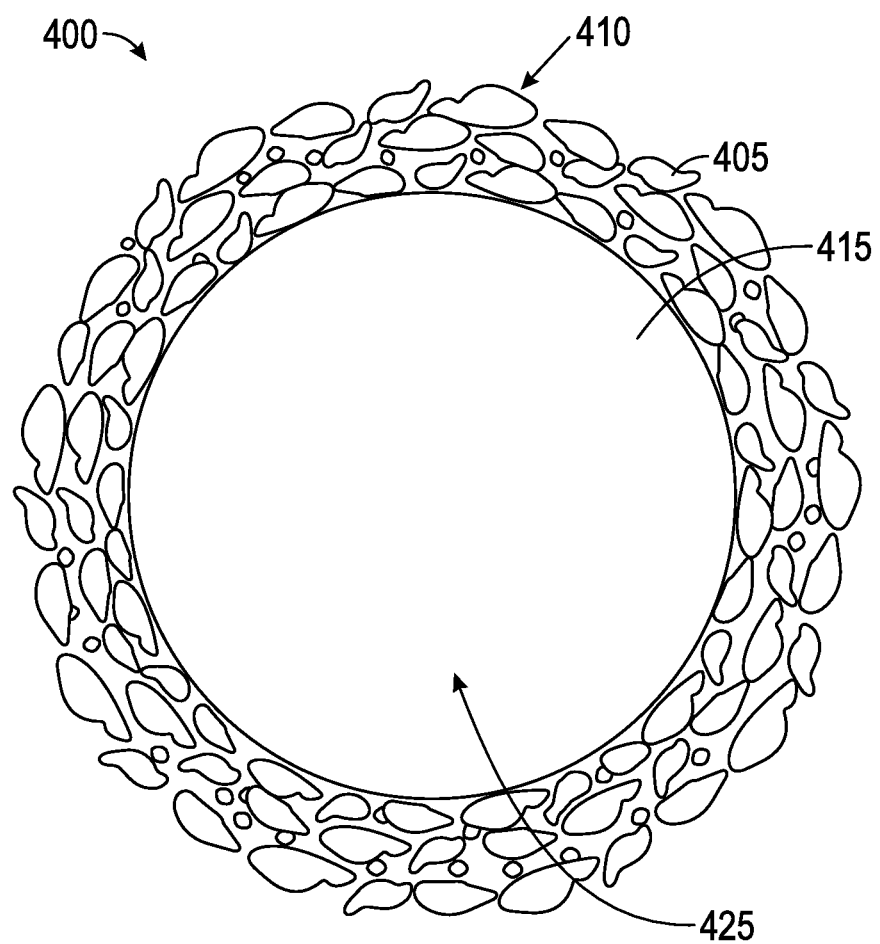
FIG. 4 is an illustration depicting the general structure and morphology of monophase amorphous hydraulic binder materials (MAHBMs), in accordance with aspects of the present disclosure.

Surprisingly, during Ultrasonic Cement Analyzer (UCA) testing of cement compositions containing MAHBMs under downhole temperature and pressure, it was observed that the cement had grown in volume. FIG. 4 depicts the general structure and morphology of monophase amorphous hydraulic binder material (MAHBMs). As depicted in FIG. 4, MAHBMs 400 are composed of a silica core 425 surrounded by a coating 410 comprised of substantially amorphous materials. The silica core 425 may comprise one or more particles of a material selected from the group consisting of crystalline silica, quartz, volcanic glass, diatomaceous earth, fly ash or other silica-based waste materials, bio ash, amorphous silica, and any combination thereof. The coating 410 may be selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Coating 410 may be comprised of a plurality of substantially amorphous particles 405. In at least some instances, the MAHBMs 400 may be nanoparticles and/or microparticles of partially dehydrated and reorganized amorphous α-dicalcium silicate hydrate (α-$C_2SH$) coated on larger crystalline silica or quartz particles 415. The silica core 425 may have a particle size of from about 5 μm to about 500 μm. In some instances, the silica core may be characterized by a particle size of from about 7 μm to about 50 μm, or from about 5 μm to about 100 μm, or from about 5 μm to about 250 μm. In some instances, the MAHBM is characterized by an average $CaO/SiO_2$ molar ratio of from about 0.1 to about 1.5, or from about 0.8 to about 1.5, or from about 0.8 to about 1.2, or from about 0.9 to about 1.1.

It has unexpectedly been found that MAHBMs performs well as an expansive cement by itself in the subterranean wellbore environment. It has also been unexpectedly found that MAHBMs may be used as an expansion agent in cement compositions. The expansive properties of cement compositions comprising MAHBMs under wellbore conditions was unexpected. The formation of α-$C_2SH$ is typically considered to have detrimental effects in wellbore cements because of its connection with strength retrogression and because it forms from lower density phases, resulting in a volume decrease which manifests itself as an increase in cement porosity and permeability.

Figure 5:
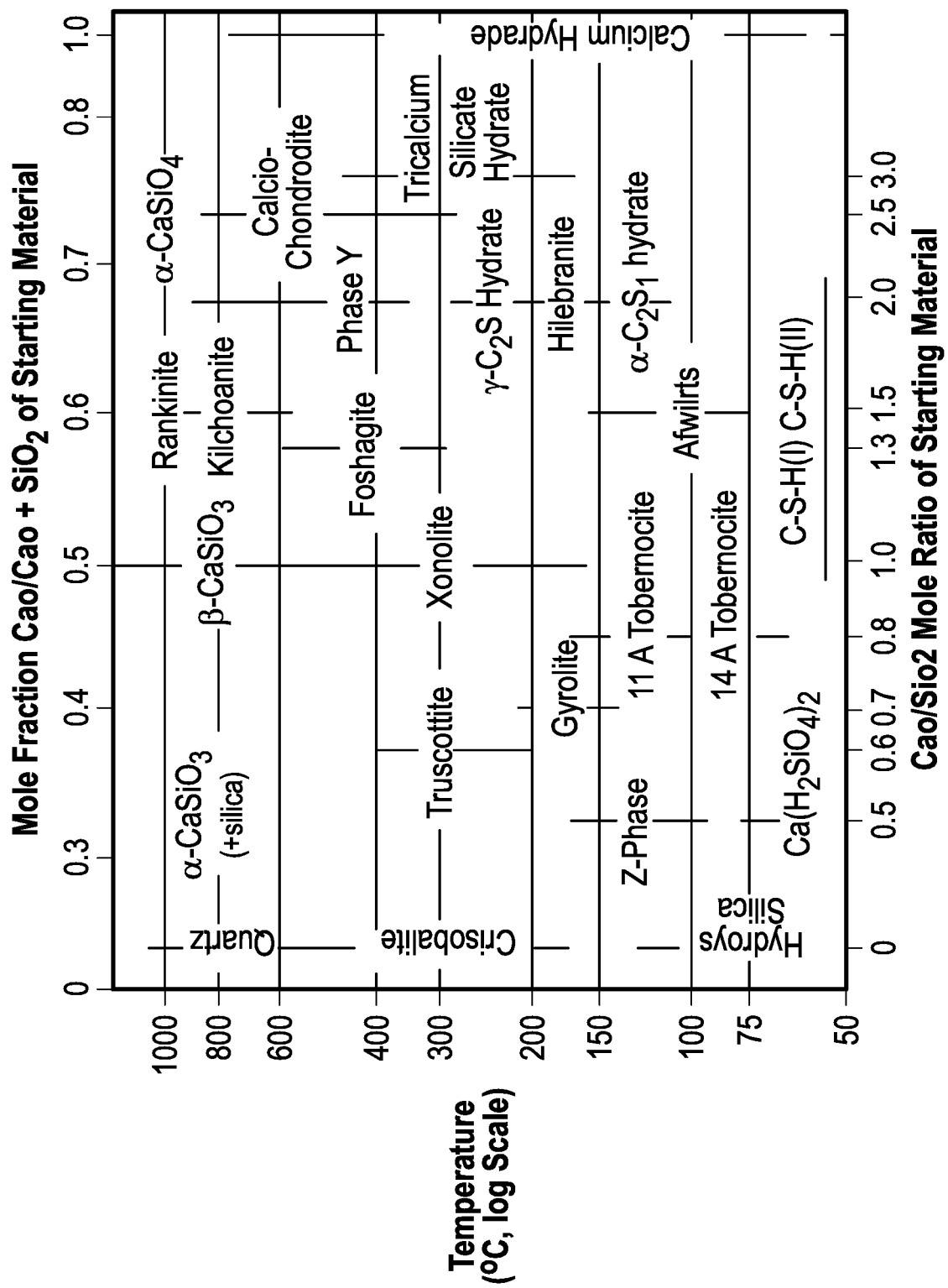
FIG. 5 is an illustration depicting crystalline species formation conditions based on $CaO/SiO_2$ ratio and temperature, in accordance with aspects of the present disclosure.

While not being held to any particular theory, the expansion of cements containing MAHBMs may be the result of the unique amorphous coating that makes up MAHBMs. In particular, the expansive properties of MAHBMs may be the result of the amorphous coating, for example, high-density phase α-$C_2SH$, hydrating and forming lower density crystalline phases, such as tobermorite and xonolite, which occupy a relatively higher volume of space. For instance, the relationship of tobermorite and xonolite to α-$C_2SH$ is shown in FIG. 5.

Conventional expansion agents, such as magnesium oxide based components and those based on ettringite formation, require access to water to achieve expansion as they draw water from the surrounding area (e.g., a geological formation) to increase the volume of the set cement. MAHBMs do not necessarily require external access to water to achieve expansion in a cement slurry as the amorphous phase transitions into a crystalline matrix having a larger volume.

As a result, cement compositions containing MAHBMs may exhibit expansion throughout the entire cement sheath as opposed to only at the interfaces that contact water or those to which water has diffused. As a result, it has been discovered that cement compositions containing MAHBMs results in advantageous properties as compared to cement compositions prepared using conventional expansion agents.

Further testing was implemented to determine the utility of the presently disclosed expansive cement compositions in oil-well cementing. The testing and positive results are described in the examples below.

The following examples are intended to be illustrative only, and are not intended to be, nor should they be construed as limiting in any way of the scope of the present disclosure.

Example 1

A cement slurry was mixed according to API procedures using the formulation shown in Table 1.

TABLE 1

| Material | Weight (g) |
| --- | --- |
| water | 292.5 |
| MAHBMs | 450 |
| HR-800 ™ cement retarder | 0.7 |

Following API Recommended Practice 10B-5/IS 10426-5, two expansion molds were filled and placed in water baths at 140° F. and 190° F. and cured under atmospheric pressure for seven days. The results of the expansion testing are provided in Table 2.

TABLE 2

| Day | Linear Inch Measurement (140° F.) | Linear Inch Measurement (190° F.) |
| --- | --- | --- |
| 0 | 0.43965 | 0.44315 |
| 1 | 0.46510 | 0.46480 |
| 2 | 0.46455 | 0.46710 |
| 3 | 0.46690 | 0.46605 |
| 4 | 0.46695 | 0.46930 |
| 7 | 0.46915 | — |
| Percent Expansion | 0.2683% | 0.2480% |

While 5% shrinkage is typical for most conventional cements, the cement formulation of Example 1 containing MAHBMs exhibited a 0.2683% expansion after seven days at 140° F. and a 0.2480% expansion at 190° F. Example 1 demonstrates that MAHBMs are self-reactive and capable of being used as an expansive cement without the use of any other expansive materials or agents.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

Numerous examples are provided herein to enhance understanding of the present disclosure. A specific set of statements are provided as follows.

Statement 1: An expansive cement composition for use in a subterranean wellbore comprising: a hydraulic cement; water; and a monophase amorphous hydraulic binder material (MAHBM).

Statement 2: The expansive cement composition according to Statement 1, wherein the MAHBM is an expansion agent.

Statement 3: The expansive cement composition according to Statement 1 or Statement 2, wherein the MAHBM comprises a plurality of particles having a silica core and a coating substantially surrounding the silica core, wherein the coating comprises a material selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 4: The expansive cement composition according to Statement 3, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 5: The expansive cement composition according to Statement 3 or Statement 4, wherein the coating comprises amorphous α-dicalcium silicate hydrate.

Statement 6: The expansive cement composition according to any one of the preceding Statements 3-5, wherein the coating comprises a plurality of amorphous α-dicalcium silicate hydrate nanoparticles or microparticles.

Statement 7: The expansive cement composition according to any one of the preceding Statements 3-6, wherein the silica core is characterized by a particle size of from about 5 μm to about 500 μm, or from about 7 μm to about 50 μm, or from about 5 μm to about 100 μm, or from about 5 μm to about 250 μm.

Statement 8: The expansive cement composition according to any one of the preceding Statements 1-7, wherein the cement composition comprises from about 5% to about 40% MAHBM by weight, or from about 5% to about 70% MAHBM by weight.

Statement 9: The expansive cement composition according to any one of the preceding Statements 1-7, wherein the cement composition comprises from about 10% to about 20% MAHBM by weight.

Statement 10: The expansive cement composition according to any one of the preceding Statements 1-7, wherein the expansive cement composition comprises from about 10% to about 30% MAHBM by weight.

Statement 11: The expansive cement composition according to any one of the preceding Statements 1-10, wherein the expansive cement composition further comprises from about 10% to about 40% by weight hydraulic cement.

Statement 12: The expansive cement composition according to any one of the preceding Statements 1-10, wherein the expansive cement composition further comprises from about 15% to about 35% by weight hydraulic cement.

Statement 13: The expansive cement composition according to any one of the preceding Statements 1-10, wherein the expansive cement composition further comprises from about 15% to about 25% by weight hydraulic cement, or from about 1% to about 70% by weight hydraulic cement.

Statement 14: The expansive cement composition according to any one of the preceding Statements 1-10, wherein the expansive cement composition further comprises from about 15% to about 20% by weight hydraulic cement.

Statement 15: The expansive cement composition according to any one of the preceding Statements 1-14, wherein the expansive cement composition further comprises from about 25% to about 60% by weight water, or from about 25% to about 80% water.

Statement 16: The expansive cement composition according to any one of the preceding Statements 1-14, wherein the expansive cement composition further comprises from about 30% to about 50% by weight water.

Statement 17: The expansive cement composition according to any one of the preceding Statements 1-14, wherein the expansive cement composition further comprises from about 35% to about 45% by weight water.

Statement 18: The expansive cement composition according to any one of the preceding Statements 1-17, wherein the cement composition further comprises from about 10% to about 40% by weight fly ash.

Statement 19: The expansive cement composition according to any one of the preceding Statements 1-17, wherein the expansive cement composition further comprises from about 15% to about 35% by weight fly ash.

Statement 20: The expansive cement composition according to any one of the preceding Statements 1-17, wherein the expansive cement composition further comprises from about 20% to about 30% by weight fly ash.

Statement 21: The expansive cement composition according to any one of the preceding Statements 1-20, further comprising a fluid loss additive.

Statement 22: The expansive cement composition according to any one of the preceding Statements 1-21, further comprising a suspending agent.

Statement 23: The expansive cement composition according to any one of the preceding Statements 1-21, wherein the expansive cement composition excludes an additional expansion agent other than the MAHBM.

Statement 24: The expansive cement composition according to any one of the preceding Statements 1-23, further comprising a defoaming agent.

Statement 25: The expansive cement composition according to any one of the preceding Statements 1-24, wherein the MAHBM is characterized by an average $CaO/SiO_2$ molar ratio of from about 0.1 to about 1.5.

Statement 26: The expansive cement composition according to any one of the preceding Statements 1-24, wherein the MAHBM is characterized by an average $CaO/SiO_2$ molar ratio of from about 0.8 to about 1.2.

Statement 27: The expansive cement composition according to any one of the preceding Statements 1-24, wherein the MAHBM is characterized by an average $CaO/SiO_2$ molar ratio of from about 0.9 to about 1.1.

Statement 28: The expansive cement composition according to any one of the preceding Statements 1-27, wherein the hydraulic cement is Portland cement.

Statement 29: An expansive cement composition for use in a subterranean wellbore comprising: a monophase amorphous hydraulic binder material (MAHBM); and water.

Statement 30: The expansive cement composition according to Statement 29, wherein the expansive cement composition comprises from about 50% to about 70% by weight MAHBM.

Statement 31: The expansive cement composition according to Statement 29, wherein the expansive cement composition comprises from about 55% to about 65% by weight MAHBM.

Statement 32: The expansive cement composition according to any one of the preceding Statements 29-31, wherein the expansive cement composition does not include Portland cement.

Statement 33: The expansive cement composition according to any one of the preceding Statements 29-32, further comprising a polymeric dispersant.

Statement 34: The expansive cement composition according to any one of the preceding Statements 29-33, further comprising a suspending agent.

Statement 35: The expansive cement composition according to any one of the preceding Statements 29-33, wherein the expansive cement composition excludes an additional expansion agent other than the MAHBM.

Statement 36: The expansive cement composition according to any one of the preceding Statements 29-35, further comprising a cement retarder.

Statement 37: The expansive cement composition according to any one of the preceding Statements 29-36, wherein the expansive cement composition further comprises from about 25% to about 60% by weight water.

Statement 38: The expansive cement composition according to any one of the preceding Statements 29-36, wherein the expansive cement composition further comprises from about 30% to about 50% by weight water.

Statement 39: The expansive cement composition according to any one of the preceding Statements 29-36, wherein the expansive cement composition further comprises from about 35% to about 45% by weight water.

Statement 40: The expansive cement composition according to any one of the preceding Statements 29-39, wherein the MAHBM comprises a plurality of particles having a silica core and a coating substantially surrounding the silica core, wherein the coating comprises a material selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 41: The expansive cement composition according to Statement 40, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 42: The expansive cement composition according to Statement 40 or Statement 41, wherein the coating comprises amorphous α-dicalcium silicate hydrate.

Statement 43: The expansive cement composition according to any one of the preceding Statements 40-42, wherein the coating comprises a plurality of amorphous α-dicalcium silicate hydrate nanoparticles or microparticles.

Statement 44: The expansive cement composition according to any one of the preceding Statements 40-43, wherein the silica core is characterized by a particle size of from about 5 μm to about 500 μm, or from about 7 μm to about 50 μm, or from about 5 μm to about 100 μm, or from about 5 μm to about 250 μm.

Statement 45: The expansive cement composition according to any one of the preceding Statements 29-44, wherein the MAHBM is characterized by an average $CaO/SiO_2$ molar ratio of from about 0.1 to about 1.5.

Statement 46: The expansive cement composition according to any one of the preceding Statements 29-44, wherein the MAHBM is characterized by an average $CaO/SiO_2$ molar ratio of from about 0.8 to about 1.2.

Statement 47: The expansive cement composition according to any one of the preceding Statements 29-44, wherein the MAHBM is characterized by an average $CaO/SiO_2$ molar ratio of from about 0.9 to about 1.1.

Statement 48: The expansive cement composition according to any one of the preceding Statements 29-47, wherein the MAHBM comprises at least 50% by weight of the cement composition.

Statement 49: A method of preparing a reduced shrinkage cement composition for use in a subterranean wellbore, the method comprising: providing a cement composition; adding an expansive agent to the cement composition to form a reduced shrinkage cement composition, the expansive agent comprising a monophase amorphous hydraulic binder material (MAHBM).

Statement 50: The method according to Statement 49, wherein the MAHBM is the only expansive agent added to the cement composition.

Statement 51: The method according to Statement 49 or Statement 50, further comprising introducing the cement composition into a subterranean wellbore.

Statement 52: The method according to Statement 49 or Statement 50, further comprising introducing the cement composition into an annulus between a casing and a wall of the wellbore; and allowing the cement composition to set.

Statement 53: The method according to any one of the preceding Statements 49-52, wherein the cement composition comprises water sufficient to form a slurry, the method further comprising introducing the cement composition into the wellbore using one or more pumps.

Statement 54: The method according to any one of the preceding Statements 49-53, wherein the cement composition comprises a hydraulic cement.

Statement 55: The method according to any one of the preceding Statements 49-54, wherein the reduced shrinkage cement composition comprises from about 5% to about 40% MAHBM by weight, or from about 5% to about 70% MAHBM by weight.

Statement 56: The method according to any one of the preceding Statements 49-54, wherein the reduced shrinkage cement composition comprises from about 10% to about 20% MAHBM by weight.

Statement 57: The method according to any one of the preceding Statements 48-53, wherein the reduced shrinkage cement composition comprises from about 10% to about 30% MAHBM by weight.

Statement 58: The method according to any one of the preceding Statements 49-57, wherein the MAHBM comprises a plurality of particles having a silica core and a coating substantially surrounding the silica core, wherein the coating comprises a material selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 59: The method according to Statement 58, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 60: The method according to Statement 58 or Statement 59, wherein the coating comprises amorphous α-dicalcium silicate hydrate.

Statement 61: The method according to any one of the preceding Statements 58-60, wherein the coating comprises a plurality of amorphous α-dicalcium silicate hydrate nanoparticles or microparticles.

Statement 62: The method according to any one of the preceding Statements 58-61, wherein the silica core is characterized by a particle size of from about 5 μm to about 500 μm, or from about 7 μm to about 50 μm, or from about 5 μm to about 100 μm, or from about 5 μm to about 250 μm.

Statement 63: The method according to any one of the preceding Statements 49-62, wherein the MAHBM is characterized by an average CaO/SiO$_2$ molar ratio of from about 0.1 to about 1.5.

Statement 64: The method according to any one of the preceding Statements 49-62, wherein the MAHBM is characterized by an average CaO/SiO$_2$ molar ratio of from about 0.8 to about 1.2.

Statement 65: The method according to any one of the preceding Statements 49-62, wherein the MAHBM is characterized by an average CaO/SiO$_2$ molar ratio of from about 0.9 to about 1.1.

Statement 66: A method of conducting a cementing operation in a subterranean wellbore using an expansive cement, the method comprising: providing a cement composition comprising a monophase amorphous hydraulic binder material (MAHBM); and introducing the cement composition into a wellbore; and allowing the cement composition to cure to form a cured cement composition; wherein the cured cement composition has an expanded volume as compared to the introduced cement composition.

Statement 67: The method according to Statement 66, wherein the MAHBM comprises a plurality of particles having a silica core and a coating substantially surrounding the silica core, wherein the coating comprises a material selected from the group consisting of amorphous α-dicalcium silicate hydrate (α-C$_2$SH), amorphous tricalcium silicate (C$_3$S), amorphous dicalcium silicate (C$_2$S), amorphous tricalcium aluminate (C$_3$A), amorphous tricalcium silicate hydrate (C$_3$SH), amorphous dicalcium silicate hydrate (C$_2$SH), amorphous tricalcium aluminate hydrate (C$_3$AH), and any combination thereof.

Statement 68: The method according to Statement 66 or Statement 67, wherein the MAHBM comprises at least 50% by weight of the cement composition, or at least 40% by weight of the cement composition.

Statement 69: The method according to Statement 66 or Statement 67, wherein the cement composition comprises from about 55% to about 65% by weight MAHBM, or from about 45% to about 65% by weight MAHBM.

Statement 70: The method according to Statement 66 or Statement 67, wherein the cement composition comprises from about 5% to about 40% MAHBM by weight, or from about 5% to about 70% MAHBM by weight.

What is claimed is:

1. An expansive cement composition for use in a subterranean wellbore comprising:
    a monophase amorphous hydraulic binder material (MAHBM);
    hydraulic cement; and
    water;
    wherein the MAHBM comprises a plurality of particles having a silica core and a coating substantially surrounding the silica core, wherein the coating comprises a material selected from the group consisting of amorphous α-dicalcium silicate hydrate (α-C$_2$SH), amorphous tricalcium silicate (C$_3$S), amorphous dicalcium silicate (C$_2$S), amorphous tricalcium aluminate (C$_3$A), amorphous tricalcium silicate hydrate (C$_3$SH), amorphous dicalcium silicate hydrate (C$_2$SH), amorphous tricalcium aluminate hydrate (C$_3$AH), and any combination thereof;
    wherein the expansive cement composition comprises from about 5% to about 70% MAHBM by weight.

2. The expansive cement composition according to claim 1, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

3. The expansive cement composition according to claim 1, wherein the coating comprises a plurality of amorphous α-dicalcium silicate hydrate nanoparticles or microparticles; and wherein the silica core is characterized by a particle size of from about 5 μm to about 500 μm.

4. The expansive cement composition according to claim 1, wherein the expansive cement composition comprises from about 1% to about 70% by weight hydraulic cement and from about 25% to about 80% by weight water.

5. A method of preparing a reduced shrinkage cement composition for use in a subterranean wellbore, the method comprising:
    providing a cement composition comprising a hydraulic cement;
    adding an expansive agent to the cement composition to form a reduced shrinkage cement composition, the expansive agent comprising a monophase amorphous hydraulic binder material (MAHBM);
    wherein the MAHBM comprises a plurality of particles having a silica core and a coating substantially surrounding the silica core, wherein the coating comprises a material selected from the group consisting of amorphous α-dicalcium silicate hydrate (α-C$_2$SH), amorphous tricalcium silicate (C$_3$S), amorphous dicalcium silicate (C$_2$S), amorphous tricalcium aluminate (C$_3$A), amorphous tricalcium silicate hydrate (C$_3$SH), amorphous dicalcium silicate hydrate (C$_2$SH), amorphous tricalcium aluminate hydrate (C$_3$AH), and any combination thereof;
    wherein the expansive cement composition comprises from about 5% to about 70% MAHBM by weight.

6. The method according to claim 5, wherein the MAHBM is the only expansive agent added to the cement composition.

7. The method according to claim 5, further comprising introducing the cement composition into a subterranean wellbore.

8. The method according to claim 5, further comprising:
    introducing the cement composition into an annulus between a casing and a wall of the wellbore; and
    allowing the cement composition to set.

9. The method according to claim 5, wherein the cement composition comprises the hydraulic cement and water sufficient to form a slurry, the method further comprising introducing the cement composition into the wellbore using one or more pumps.

10. A method of conducting a cementing operation in a subterranean wellbore using an expansive cement, the method comprising:
- providing a cement composition comprising a monophase amorphous hydraulic binder material (MAHBM) and a hydraulic cement; and
- introducing the cement composition into a wellbore; and
- allowing the cement composition to cure to form a cured cement composition;
- wherein the cured cement composition has an expanded volume as compared to the introduced cement composition;
- wherein the MAHBM comprises a plurality of particles having a silica core and a coating substantially surrounding the silica core, wherein the coating comprises a material selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof;
- wherein the expansive cement composition comprises from about 5% to about 70% MAHBM by weight.

* * * * *